(No Model.)

5 Sheets—Sheet 1.

J. J. COURTNEY.
MOWING MACHINE.

No. 445,391.   Patented Jan. 27, 1891.

Witnesses
Chas A. Sanborn
J. A. Paddock

Inventor
J. J. Courtney
Per D. Strunk
Atty (No Model.)

J. J. COURTNEY.
MOWING MACHINE.

No. 445,391.

5 Sheets—Sheet 2.

Patented Jan. 27, 1891.

Witnesses
Chas A Santon
J. A. Paddock

Inventor
J J Courtney
Per D Strunk
Atty

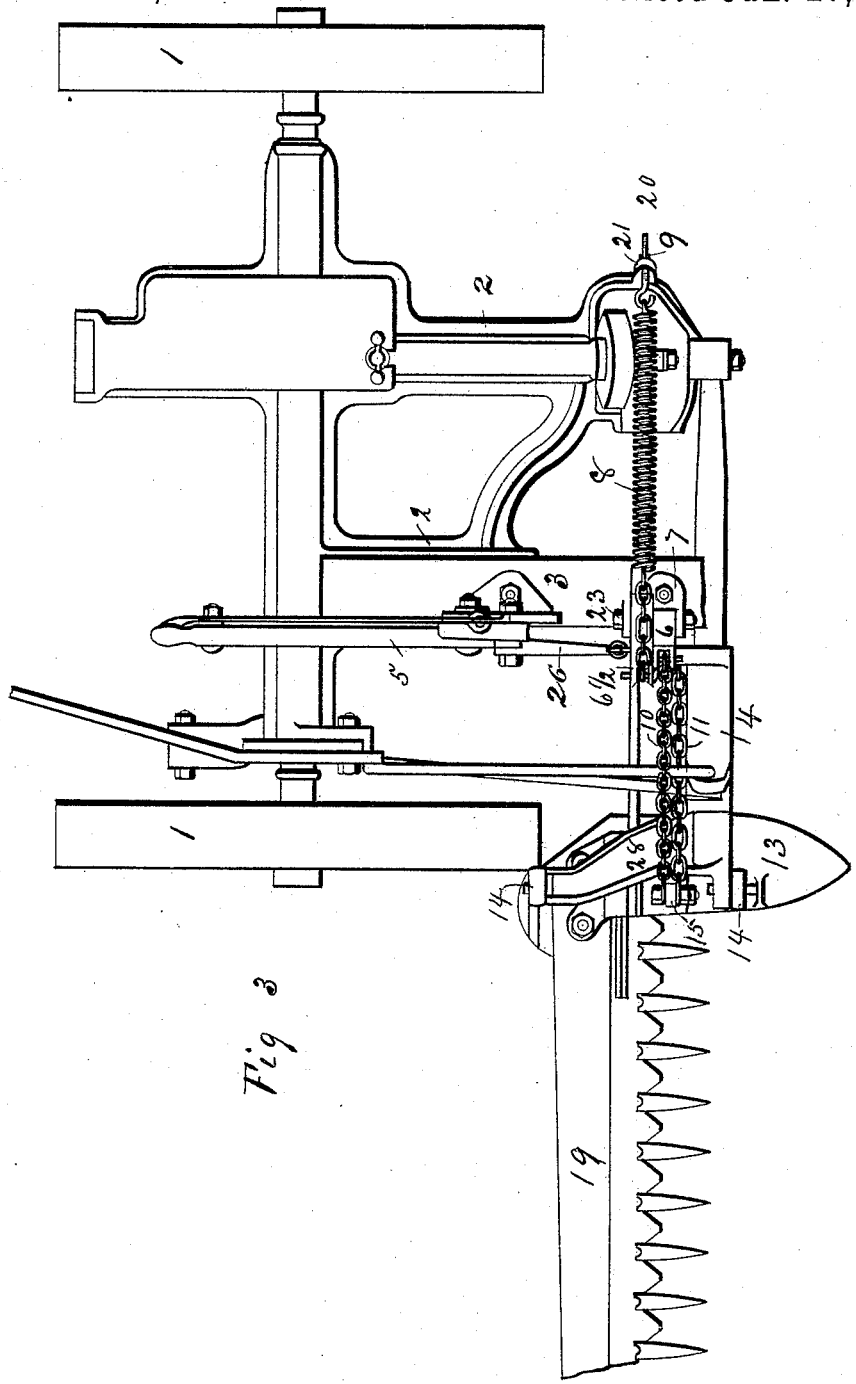

(No Model.) 5 Sheets—Sheet 4.
J. J. COURTNEY.
MOWING MACHINE.
No. 445,391. Patented Jan. 27, 1891.
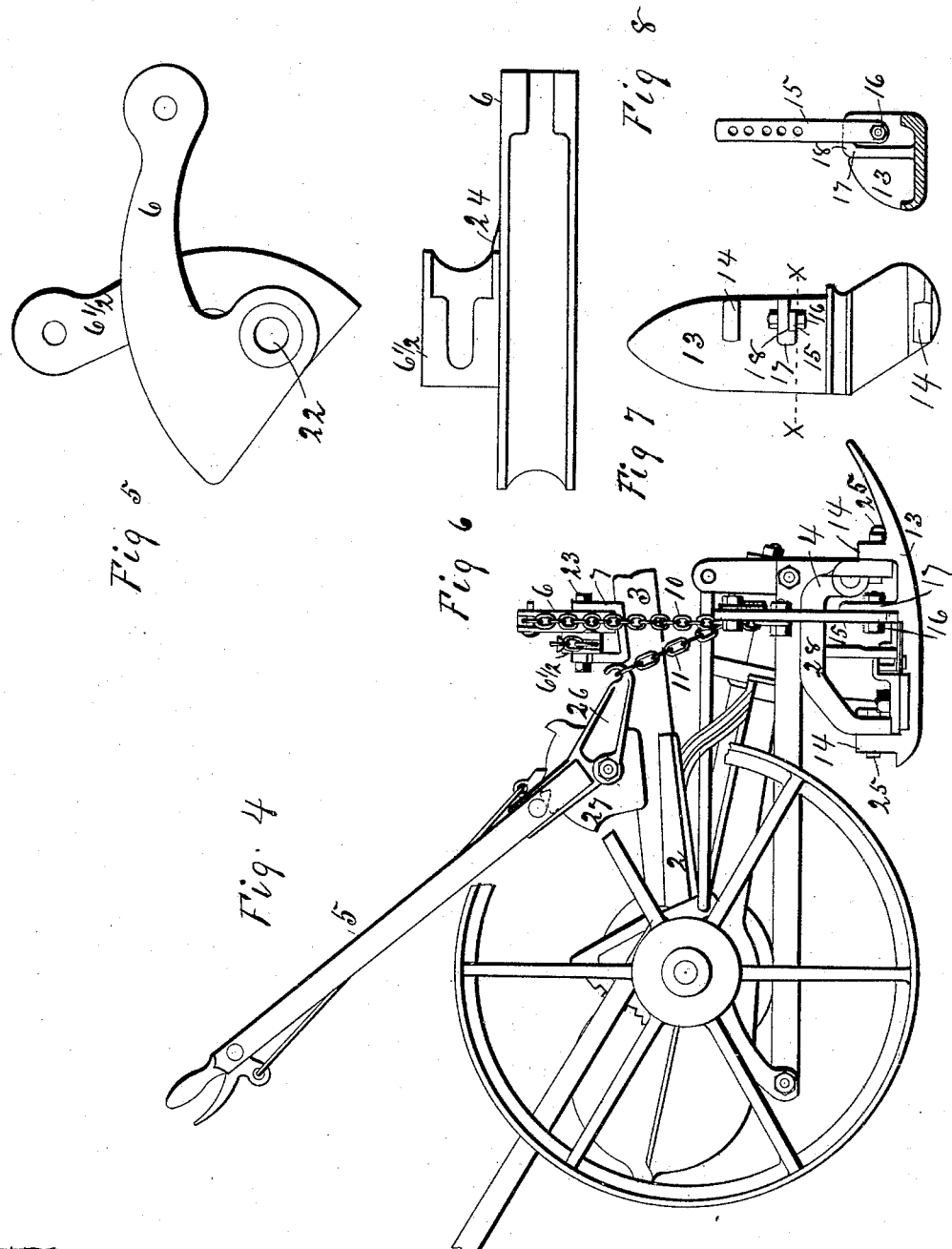

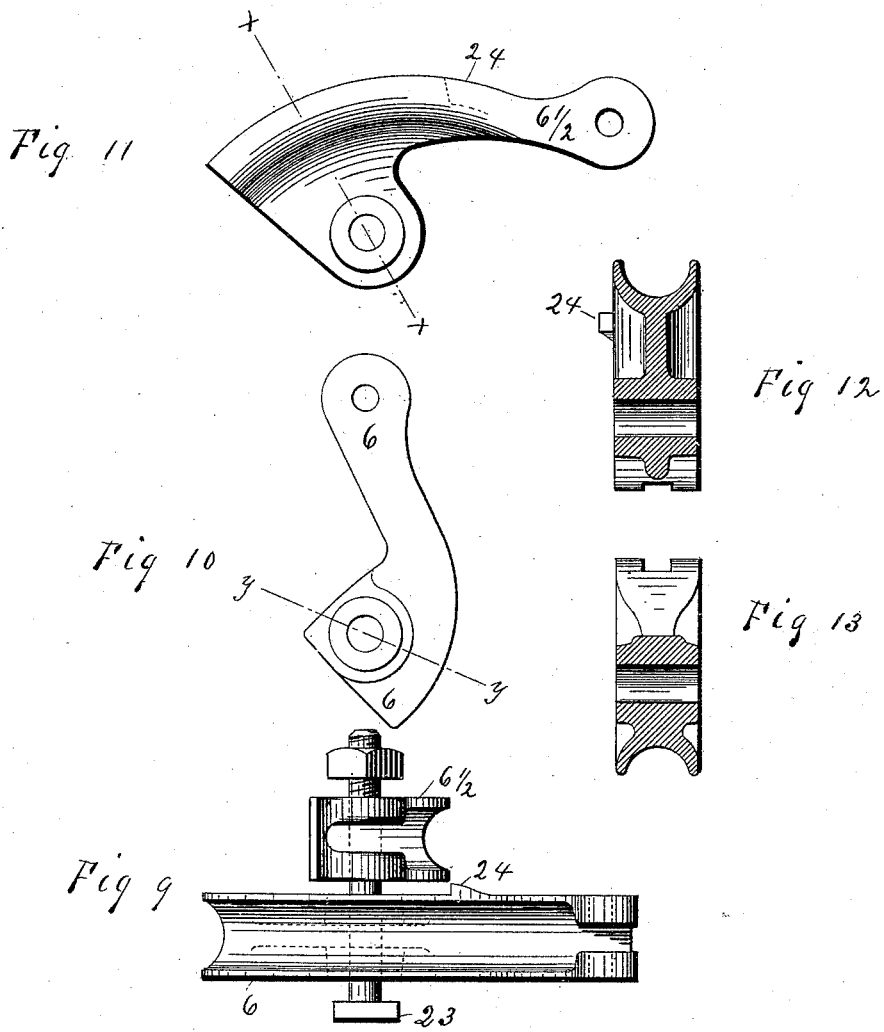

UNITED STATES PATENT OFFICE.

JOHN J. COURTNEY, OF MINNEAPOLIS, MINNESOTA, ASSIGNOR TO THE MINNEAPOLIS HARVESTER WORKS, OF SAME PLACE.

MOWING-MACHINE.

SPECIFICATION forming part of Letters Patent No. 445,391, dated January 27, 1891.

Application filed March 18, 1890. Serial No. 344,433. (No model.)

*To all whom it may concern:*

Be it known that I, JOHN J. COURTNEY, a citizen of the United States, residing at Minneapolis, in the county of Hennepin and State of Minnesota, have invented new and useful Improvements in Mowing-Machines, of which the following is a specification.

My invention relates to that class of mowing-machines in which a part of the weight of both the stubble and grass ends of the cutting apparatus is supported by a spring, whereby the said cutting apparatus will pass over the ground when in operation with less friction and be more easily elevated above the ground by the operator to pass obstructions, &c. It is well known that in the use of a spring for this purpose heretofore the greatest lifting-power of the spring has been applied to the cutting apparatus when the latter was at its lowest position, and that as the cutting apparatus was raised to a higher position either to pass obstructions or by extreme irregularity of the ground the lifting-power of the spring as applied to the cutting apparatus has been greatly diminished by the retraction and consequently greatly reduced tension thereof.

My invention consists of devices so constructed and arranged that the capacity of the said spring to support a given portion of the weight of the cutting apparatus will be substantially constant whether the said cutting apparatus be at its lowest, highest, or any intermediate position, and that the usual twisting or torsional strain to which the main frame or pole is subjected by the suspension of the weight of the cutting apparatus therefrom is avoided; also, devices whereby the outer or grass end of the cutting apparatus will be raised from the ground by the operator concurrently with the inner or stubble end thereof to pass obstructions, &c., and in other improvements which are fully described in the following specification.

Figure 1:
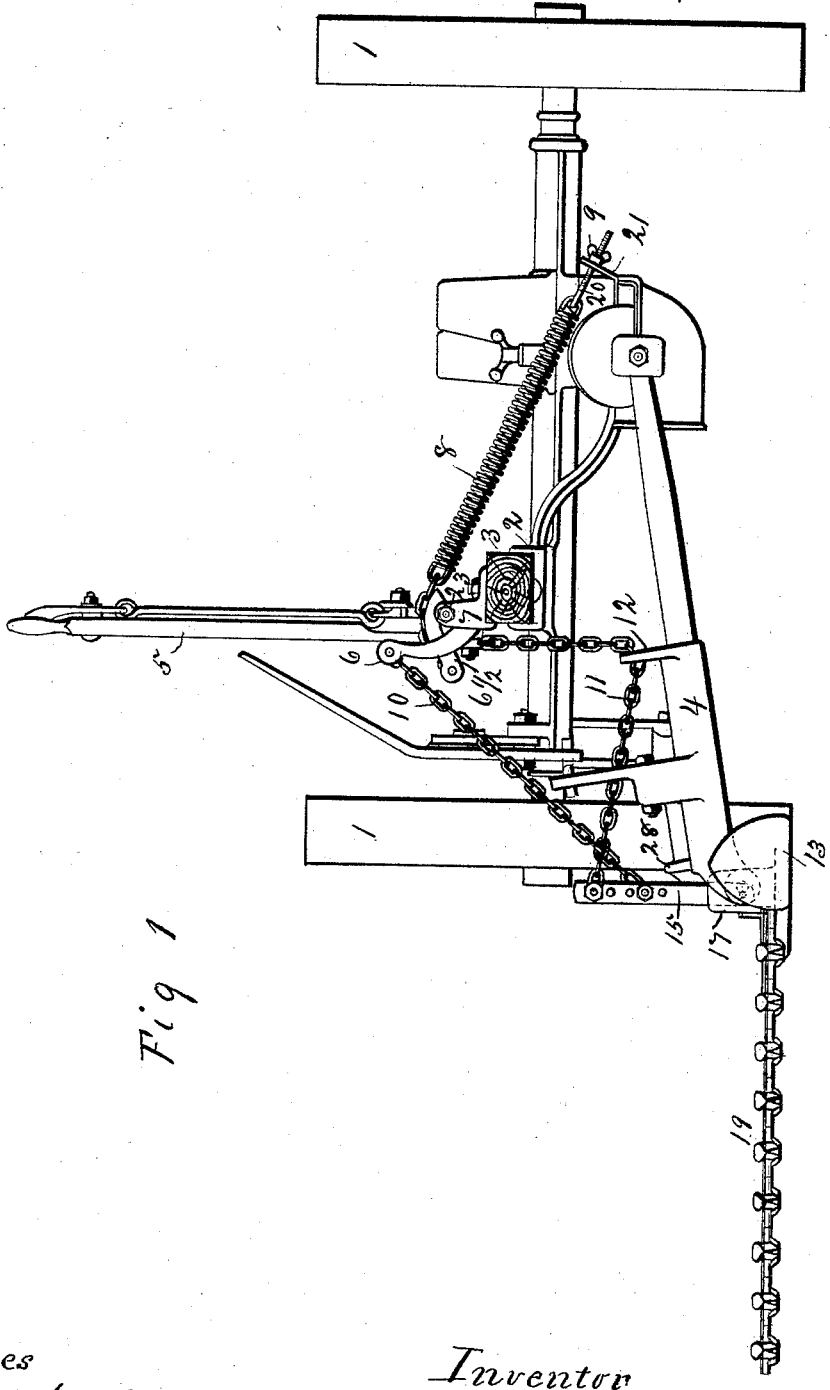
Figure 2:
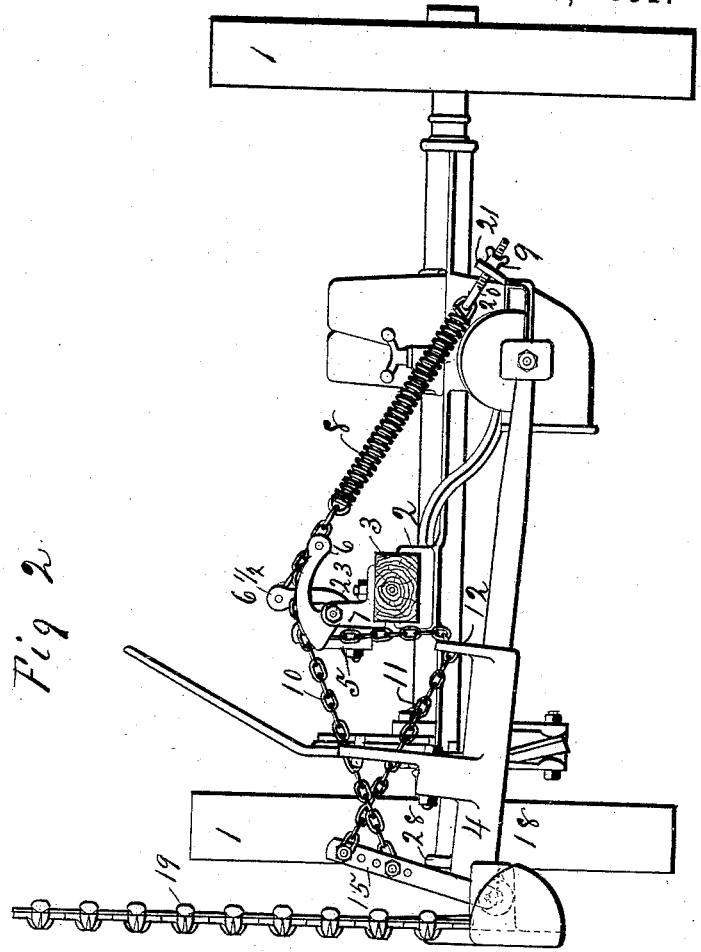

In the drawings, Figure 1 is the front elevation of a mowing-machine, with the cutting apparatus in a working position. Fig. 2 is a similar view with the cutting apparatus raised to its highest position and folded for transportation. Fig. 3 is a plan view with the cutting apparatus in a working position; and Fig. 4, a side elevation looking from the grass toward the stubble side of the machine, with the cutting apparatus in a working position. Fig. 5 is an elevation of a double compensating cam whereby a substantially constant lifting force is communicated from the supporting-spring to the cutting apparatus, and Fig. 6 is a plan view of the same. Fig. 7 is a plan view of the main shoe, and Fig. 8 a vertical section of the same on the line X X of Fig. 7. Fig. 9 is a plan view of the double compensating cam mounted upon a pivotal bolt 23, with the two members of the cam slightly separated to show more clearly the manner in which the member 6 bears against the projection 24 on the member 6½ to determine and maintain the proper relative position of the two members. Figs. 10 and 11 are side elevations of the two members of the double cam; and Figs. 12 and 13, sectional views on the lines $x\ x$ and $y\ y$, respectively.

In the several figures, 1 1 are the main wheels of a mowing-machine.

2 is the main frame, 3 the pole, and 4 the coupling-bar hinged to the main frame in the usual manner.

5 is hand raising-lever; 6, a double compensating cam mounted on the main frame or pole 3, as shown; 7, a bracket or support for the double cam 6; and 8 a spring for supporting the cutting apparatus by the chain 10. The spring 8 is provided with the adjustable connection 20 and thumb-nut 9 for adjusting the tension thereof.

11 is a raising-chain whereby, in connection with the hand-lever 5, the cutting apparatus may be raised from the ground.

13 is the main shoe of the cutting apparatus, provided with the lugs 14, to which the coupling-bar 4 is hinged by means of the yoke 28 thereon.

15 is a lever provided with a series of holes at the upper end thereof, as shown, pivoted at 16 to a lug 17 on the main shoe 13. The lug 17 is provided with a shoulder 18, against which the lever 15 bears to limit the pivotal movement of the said lever in a stubbleward direction and confine the same to a position substantially at a right angle to the cutting apparatus, except where the latter is folded, as in Fig. 2, in which case the pivotal connection of the lever 15 with the cutting apparatus permits the latter to assume a vertical position without disturbing the substantially upright position of the lever 15. The finger-bar 19 is attached to the main shoe 13 in the usual manner.

The spring 8, Fig. 1, is connected at one end by an adjustable connection 20 to the lug 21 of the main frame and at the other end to one arm 6 of the compensating cam. The other arm 6½ of the compensating cam is connected by the chain 10 to the upright lever 15, as shown, by a bolt inserted through one of the series of holes in the upper end thereof.

When the cutting apparatus is resting upon the ground in a working position, as in Fig. 1, the adjustment of the several parts is such that the spring 8 will be drawn out by the weight of the cutting apparatus to nearly its greatest extent and will in that position exert its greatest power upon the compensating cam; but the relative positions of the parts are such that the spring exerts its power upon the short arm of the compensating cam, while the long arm thereof is connected to the cutting apparatus by the lever 15. When the cutting apparatus is raised to its greatest height, as in Fig. 2, the spring 8 retracts to a point where it exerts the least force upon the compensating cam, which by a partial rotation upon its center has so changed the relative distance from the center of the cam to the points where the chain 10 and spring 8 act thereon as levers that what was the short arm in Fig. 1 has become the long arm in Fig. 2, and vice versa, so that the spring 8 by exerting its greatest force upon the short arm of the compensating cam, and that force being transmitted to the cutting apparatus from the long arm thereof, and its smallest force upon the long arm of the said compensating cam, which force is transmitted to the cutting apparatus from the short arm thereof, exerts substantially constant force upon the cutting apparatus whatever its position may be.

The compensating cam being located higher than its point of connection to the upright lever 15 by the chain 10 and stubbleward thereof, as shown in Fig. 1, the reacting force of the spring is transmitted to the cutting apparatus in an upward and stubbleward direction, with the obvious result that the force exerted in an upward direction tends to raise the inner or stubble end of the cutting apparatus, and the force exerted stubbleward tends to raise the outer or grass end thereof by rocking the main shoe upon its hinge-joint. The relative force of the spring 8, exerted upward and stubbleward upon the cutting apparatus, is made adjustable by means of the series of bolt-holes in the upper end of the lever 15, as shown in Figs. 1 and 2.

It has been the practice heretofore in some instances to support the cutting apparatus wholly at the grass side of the pole or main frame, whereby a great twisting or torsional strain was transmitted to the part from which the cutting apparatus is supported, particularly where the finger-bar was long and the cutting apparatus correspondingly heavy. In my device the spring 8 is at the opposite side of the supporting-point from the cutting apparatus and is connected to the opposite side of the main frame from that at which the cutting apparatus is supported, and the point of connection 21 with the main frame is in substantially the same horizontal plane as the point of connection with the cutting apparatus, whereby the strain thrown upon the machine at the principal point of support for the cutting apparatus is in a substantially vertical direction.

The tension of the spring 8 and the resulting lifting force as applied to the cutting apparatus are made adjustable by the connection 20, passing through a hole in the lug 21 on the main frame, where it is held in adjustment by the thumb-nut 9. The double compensating cam, Figs. 5, 6, 9, 10, and 11, is made preferably in two parts 6 and 6½, each of which is provided with an opening 22, as shown in Fig. 5, although it may be made integral. Through the opening 22 and a corresponding opening in the bracket 7 a bolt 23 is inserted, as shown in Figs. 1, 2, 4, and 9, upon which bolt the compensating cam vibrates freely. The proper relative position of the parts 6 and 6½ of the compensating cam is secured by a shoulder or projection 24 (shown in Figs. 6 and 9 and by the dotted line in Fig. 5) on the part 6, against which the part 6½ is held by the action of the spring 8 and weight of the cutting apparatus. The two arms of the compensating cam are provided with bolt-holes at their ends, as shown, for convenience of attaching the spring 8 and chain 10 by suitable connections.

The necessity in a mowing-machine for a finger-bar which shall have perfect liberty to follow all irregularities of the ground upon which it works and which may be raised by the operator to pass obstructions, the outer concurrently with the inner end thereof, is so well understood that it is not thought necessary to explain it here. In my device I meet the necessity as follows: The coupling-bar 4 is connected to the main frame 2 as shown in the drawings, which is a manner so well known that it is not thought necessary to describe it in detail, or the connection may be made in any other effective manner, it being understood that the free portion of the coupling-bar, with the cutting apparatus hinged thereto by the coupling-pins 25 and yoke 28 of the coupling-bar, Fig. 4, has perfect freedom to rise and fall with undulations of the ground at that end of the cutting apparatus, there being provided a sufficient amount of slack in the chain 11 for that purpose. The outer or grass end of the cutting apparatus also has perfect freedom to follow undulations of the ground by reason of the hinge-connection with the coupling-bar. The raising hand-lever 5, Fig. 4, provided with the usual locking device and a short arm 26, is mounted upon a quadrant-rack 27, which is fixed to the top of the pole, as shown, or attached to any other convenient part of the main frame in any convenient manner. Attached to the short arm 26 of the lever 5 is a chain 11, which descends thence in a nearly-vertical direction to the coupling-bar 4, Fig. 1, upon which an eye or opening 12 is provided, through which the chain 11 passes in a substantially horizontal direction grassward to the pivoted lever 15, where it is attached near the top thereof, as shown.

The operation of the raising device is as follows: The first effect of the backward movement of the hand-lever 5 is to take up what slack there may be in the chain 11, as in Figs. 1 and 4, where the device is shown with the chain 11 made taut by the backward movement of the hand-lever 5. Until the slack is entirely taken from the chain 11 the same renders freely through the eye 12, Fig. 1; but when the chain 11 becomes taut by encountering the weight of the cutting apparatus the friction of the chain upon the eye 12 becomes so great that it will not render through the eye 12, but becomes as fixed at that point as if permanently attached thereto. Thus it will be seen that a continued backward movement of the hand-lever 5 will raise the whole cutting apparatus from the ground, suspending it by the chain 11 from the eye 12, the outer or grass end of the cutting apparatus being caused to rise concurrently with the stubble end thereof by the chain 11, connecting the lever 15 of the cutting apparatus to the eye 12 of the coupling-bar.

When the cutting apparatus is folded, as in Fig. 2, and the shoulder 18, Figs. 2, 7, and 8, is thereby carried away from the lever 15, Fig. 2, the said lever 15 bears against the yoke 28 of the coupling-bar, and is thereby retained in a substantially upright position, whereby there is no slackening of the chain 11 by the folding of the cutting apparatus.

The cutting apparatus is folded by simply raising the grass end thereof to a vertical position by hand and fastened there by any of the well-known devices in common use for that purpose.

I am aware that it is not new to use a double compensating cam to equalize the power of a spring as applied to the cutting apparatus of a mowing-machine to carry a part of the weight of both the stubble and grass ends thereof; but heretofore such cam, together with the spring and its connections, has been located at that side of the pole or main frame from which the cutting apparatus was suspended, causing thereby a considerable torsional or twisting strain of the parts sustaining the weight of the cutting apparatus, and the connecting member used to unite the cam with the cutting apparatus, as heretofore used, has been a chain or its equivalent descending in a nearly-vertical line from the cam to the coupling-bar of the mower, where the said chain passed under a sheave in nearly a horizontal direction to an upright projection or lever at the stubble side of the cutting apparatus, where it was attached, the vertical part of the chain tending to lift the stubble end of the cutting apparatus, and the horizontal part the grass end thereof, whereas in my device, the cam being located on the top of the pole and the spring with its connections to the main frame at the stubbleward or opposite side thereof from the cutting apparatus, all tendency to warp or twist the pole or frame is avoided, whereby those parts may be made correspondingly lighter, and, the cam being connected directly to the upright projection or lever of the cutting apparatus by a member extending in an oblique downward direction grassward from the former to the latter, the necessary lifting-power of the spring is applied to both the stubble and grass ends of the cutting apparatus without the intervention of a sheave or roller, thus reducing the complexity, weight, and cost of the machine.

Having thus described my invention, what I claim as new, and desire to secure by Letters Patent, is—

1. The combination, in a mowing-machine, of a cutting apparatus hinged to a coupling-bar and having an upright lever attached at the stubble end thereof, a double compensating cam upon the main frame or pole of the machine in a higher horizontal plane and stubbleward of the upright lever, a chain or its equivalent connected at one end to the upright lever and extending thence in an upward oblique direction stubbleward to the compensating cam, to one arm of which the other end of the chain is attached, and a spring having one end connected to the other arm of the compensating cam and the other end connected to the main frame at the stubbleward side thereof in substantially the same horizontal plane as that in which the compensating cam is connected to the upright lever, substantially as described.

2. The combination, in a mowing-machine, of a cutting apparatus hinged to a coupling-bar and having an upright lever pivoted thereto at the stubble end thereof, a shoulder or stop to limit the stubbleward movement of the upright lever, a double compensating cam upon the main frame or pole of the machine in a higher horizontal plane and stubbleward of the upright lever, a chain connected at one end to the upright lever and extending thence in an upward oblique direction stubbleward to the compensating cam, to one arm of which the other end of the chain is attached, and a spring at the opposite side of the pole from the cutting apparatus, having one end attached to the other arm of the compensating cam and the other end attached by an adjustable connection to the main frame at the stubbleward side thereof in substantially the same horizontal plane as that in which the compensating cam is connected to the upright lever, substantially as described.

3. The combination, in a mowing-machine, of a cutting apparatus hinged to a coupling-bar and having an upright lever pivoted thereto at the stubble end thereof, a double separably-constructed compensating cam upon the main frame or pole of the machine in a higher horizontal plane and stubbleward of the upright pivoted lever, a chain connected at one end to the upright pivoted lever and extending thence in an upward oblique direction stubbleward to the compensating cam, to one arm of which the other end of the chain is attached, and a spring having one end connected to the other arm of the compensating cam and the other end connected to the main frame at the stubbleward side thereof in substantially the same horizontal plane as that in which the compensating cam is attached to the pivoted lever, substantially as described.

4. In a mowing-machine, a double separably-constructed compensating cam for equalizing the lifting-power of a spring as applied to the cutting apparatus thereof, composed of the separate parts 6 and 6½, in combination with the bolt 23, the bracket 7, and stop 24, substantially as described.

5. The combination, in a mowing-machine, of the cutting apparatus 19, the coupling-bar 4, the upright pivoted lever 15, the shoulder 18, the chain 10, the separably-constructed compensating cam 6 and 6½, the stop 24, the bolt 23, the bracket 7, the spring 8, adjustable connection 20, and lug 21 on the main frame, substantially as described.

JOHN J. COURTNEY.

Witnesses:
GEORGE A. HANSON,
GEORGE H. SWINDELLS.